United States Patent [19]

Schatzberg

[11] Patent Number: 4,756,467
[45] Date of Patent: Jul. 12, 1988

[54] SOLDERABLE ELEMENTS AND METHOD FOR FORMING SAME

[75] Inventor: Myron D. Schatzberg, Chester, N.J.

[73] Assignee: Carlisle Corporation, Cincinnati, Ohio

[21] Appl. No.: 848,028

[22] Filed: Apr. 3, 1986

[51] Int. Cl.⁴ ............................................. B23K 1/20
[52] U.S. Cl. .................................. 228/208; 428/647; 428/929
[58] Field of Search ............... 427/118, 120; 228/193, 228/208; 428/647, 673, 671, 929, 607

[56] References Cited

U.S. PATENT DOCUMENTS 1,810,499  6/1931  Romp.
1,904,241  4/1933  Kammerer.
2,239,771  4/1941  Becker.
2,294,482  9/1942  Siegmund.
2,417,967  3/1947  Booe.
3,097,965  7/1963  Wilkins.
3,314,771  4/1967  Hoffmann et al.
4,391,848  7/1983  Hilker .................................. 427/118
4,441,118  4/1984  Fister et al.

FOREIGN PATENT DOCUMENTS 5398072   2/1977  Japan.
5878312  11/1981  Japan.

Primary Examiner—Nicholas P. Godici
Assistant Examiner—Karen Skillman
Attorney, Agent, or Firm—McAulay, Fields, Fisher, Goldstein & Nissen

[57] ABSTRACT

A wire having enhanced solderability characteristics is formed by applying a very thin uniform coat of silver to a clean copper wire substrate. A coat of tin is plated on top of the silver. Heat treatment causes the silver and tin to form an interface alloy. The device can be other than a wire and the substrate can be other than copper.

20 Claims, 1 Drawing Sheet

FIG. 1

SOLDERABLE ELEMENTS AND METHOD FOR FORMING SAME

BACKGROUND OF THE INVENTION

This invention relates to electronic interconnect devices, such as wires and terminals, which have enhanced solderability characteristics, and to a method for forming such devices.

Both lead wires and hook-up wires are soldered to other wires or to other connectors to create electrical connections as required for a wide variety of purposes. The bond made by the soldering, both mechanically and electrically secure. Interconnect problems are costly and dangerous. For example, in the military, interconnect problems may be the largest single source of electronic equipment down time.

Solderable wire generally is formed by tin plating on a copper substrate core. Ideally, the tin plate reacts with the tin-lead alloy of the solder to create a bond during the soldering process. However, either prior to the soldering or during the soldering, to avoid problems such as circuit failure, must be process the tin interacts with the core metal to form interface compounds such as $Cu_6Sn_5$ and $Cu_3Sn$ which are not capable of forming a secure bond with the solder. This results in an unstable connection being formed. These interface compounds will form over time at room temperature or more quickly when heat is applied to the wire during soldering or annealing. Additionally, tin is permeable to oxygen resulting in substrate oxides, which like the other interface compounds, weaken the mechanical bond between the solder and the connector.

One solution to provide a solderable wire is to plate the wire core with silver rather than tin. The silver does not oxidize or react with the core to form interface compounds and is left free to create a strong bond with the solder. However, silver is expensive to use.

Accordingly, it is a purpose of this invention to provide an improved solderable wire which forms stable mechanical and electrical bonds.

Yet a further purpose of this invention is to provide such a wire which has an enhanced shelf life.

Another purpose of this invention is to provide such a wire which is economical to produce.

BRIEF DESCRIPTION

In brief, one embodiment of this invention involves a wire having enhanced solderability characteristics. This wire is formed by applying a thin, uniform coat of silver to a clean wire substrate, such as copper. A coat of tin is plated on top of the silver coat. The silver and tin form an interface alloy. This interface alloy is created by diffusing the silver into the tin during the annealing stage required after the coated wire has been drawn. Where the connector is a terminal or grommet, made in a fashion that does not require annealing, then a heating stage is required to effect the diffusion of the silver and tin into one another.

THE FIGURES

FIG. 1 is a longitudinal sectional view through the surface of a segment of a wire embodiment of this invention. The various layers 14, 16 and 18 are not shown in proportional thickness. However, only a portion of the section through the substrate 12 is shown in order to retain some approximate degree of proportionality.

FIG. 2 is a flow chart diagram illustrating the method of manufacture of the FIG. 1 wire.

DESCRIPTION OF THE PREFERRED EMBODIMENTS

Figure 1:
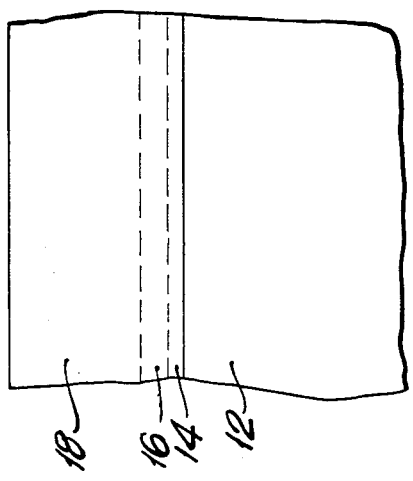

As shown in the FIGS., the improved solderable wire 10 of the present invention includes a wire substrate or core 12 formed of an appropriate metal such as copper or iron. Outboard of the substrate is a silver layer 14. Outboard of the silver layer 14 is an interface alloy layer 16 of silver and tin. Outboard of alloy layer 16 is a tin layer 18.

Figure 2:
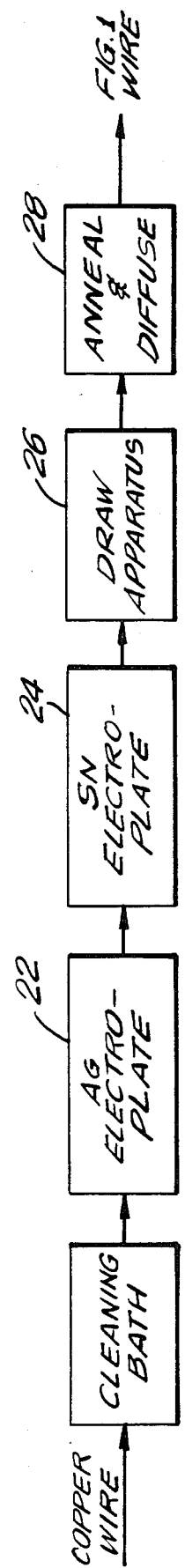

As shown in FIG. 2, the method of making one wire embodiment of this invention is to feed a source of copper wire through a cleaning bath 20 and then through a first electro-plating bath 22 wherein a thin uniform layer of silver is deposited along the entire surface of the copper wire. In one embodiment, the amount of silver deposited was approximately 0.15 of one percent (0.15%) by weight of the copper wire. The silver plated wire is then fed through a second electro-plating bath 24 in which tin is deposited in a substantially uniform fashion over the entire surface of the silver plated wire. In one embodiment, the amount of tin deposited was five percent by weight of the copper wire. The output from the electro-plating bath 24 is a wire having a copper substrate on which there is a very thin silver layer and on top of that there is a tin layer. The plated wire so provided is normally provided at a diameter substantially greater than is used for element leads or for hook-up wires. Thus, the next stage involves a drawing apparatus 26 to draw down the wire to the desired diameter. This drawing constitutes a cold working which requires that the wire be annealed. Thus, the next stage is an annealing stage 28. The temperature provided during this annealing stage is such as to cause the silver and tin plates to diffuse sufficiently into one another to form a silver-tin alloy.

More specifically, in one embodiment, the wire 10 is so formed with the following parameters.

A thin, uniform coat of silver is plated on a clean copper wire substrate in the following manner.

Two hundred and seventy-five feet (83.8 meters) of wire per minute is run through a plating bath 22 at a current of 33 amperes. Multiple wrap plater equipment is used in which twenty four wraps travel at the same time. The wire diameter is 0.078 inches (0.195 cm). There are fifty feet (about fifteen meters) per wrap, thus twelve hundred feet (365 meters) of wire are in the plater at any one time providing twenty four square feet of wire surface exposed to plating at a time. This means a current density of 1.3 amperes per square foot. The dwell time in the plater is 4.36 minutes. Assuming a one hundred percent cathode efficiency, the resulting wire is 0.15 of one percent (0.15%) by weight silver.

Subsequent to the plating of the silver on the substrate, the tin is plated on the silver by a standard tin plating procedure 24. About seventy-five feet (23 meters) of wire per minute are exposed to the electro-plating in a twenty four wrap multiple wrap plater. The dwell time is sixteen minutes resulting in approximately five percent by weight of tin on the wire.

Subsequent to the plating of the tin, the wire is drawn to size, placed in a sealed retort, and then annealed in a four cycle process. In the first cycle, nitrogen is used at room temperature to purge oxygen from the retort. The cycle takes approximately 1.5 hours. In the second cycle, the retort is placed under a heating mantel for about 2 hours until the annealing temperature of 195 degrees Centigrade (380° F.) is reached. In the third cycle, the retort is held under the heating mantel at 195° C. for about one and one half (1.5) hours. This temperature allows diffusion between the tin and silver layers while avoiding diffusion between the silver and the substrate layer. In the fourth cycle, the heating mantel is removed from the retort, and the retort is quenched with water for about three hours until it cools to room temperature.

During the annealing of the wire, the tin-silver alloy layer is formed. It is this tin-silver alloy layer which prevents formation of undesirable copper/tin interface compounds and which permits the wire of the present invention to form stable solderable bonds in an economic manner. Although most of the silver diffuses into the tin to form the tin-silver alloy 16, it is probable, and perferrable, for a small silver layer 14 to remain on the wire. The solderable wire produced by this method, has a long shelf life and can be used to create long lasting mechanical and electrical bonds.

Although this invention has been described in connection with the specific wire connector embodiment with which the invention has been tested, it should be understood that the solderability problem affects not only component lead wires and hook-up wires but also the various terminals and connectors to which these wires are soldered. Those terminals, such as terminal posts, lugs and terminal openings, are all elements which can be usefully fabricated employing the technique of this invention.

What is claimed is:

1. The method of forming solderable connectors comprising the steps of:
    applying a thin uniform coat of silver to a clean substrate,
    applying a tin coat on top of said silver coat, and
    diffusing said silver and said tin into each other at a temperature and for a time sufficient to create an interface alloy between said silver and said tin such that the outermost layer of said solderable connector is tin and the layer immediately below said tin layer is said interface alloy layer.

2. The method of claim 1 wherein substantially all of said silver is part of said interface alloy.

3. The method of claim 1 wherein: the temperature applied during said step of diffusing is at least high enough to cause silver and tin to diffuse into one another but lower than a temperature which will cause silver and the substrate to substantially diffuse into one another.

4. The method of claim 3 wherein said substrate is copper.

5. The method of claim 4 wherein said temperature during said step of diffusing is approximately 195 degrees centigrade.

6. The method of claim 1 wherein said step of applying a silver coat comprises an electro-deposition process.

7. The method of claim 1 wherein said substrate is wire and further comprising the step of: drawing down said wire to a predetermined size after said step of applying a tin coat; said step of diffusing including the annealing of said drawn down wire.

8. The method of claim 1 wherein the weight of silver on said substrate is substantially no greater than 0.15% of the weight of said substrate.

9. The method of claim 7 wherein: the temperature applied during said step of diffusing is at least high enough to cause silver and tin to diffuse into one another but lower than a temperature which will cause silver and the substrate to substantially diffuse into one another.

10. A connector having enhanced solderability characteristics consisting essentially of:
    a substrate,
    a tin coat on the outer surface of said connector, and
    a silver-tin alloy generated by the diffusion of silver and tin along the interface between said substrate and said tin coat.

11. The connector of claim 10 wherein:
    said substrate is copper and there is substantially no diffusion of silver into said copper.

12. The connector of claim 10 wherein substantially all of said silver is part of said interface alloy.

13. The connector of claim 11 wherein substantially all of said silver is part of said interface alloy.

14. The connector of claim 10 wherein said substrate is wire.

15. The connector of claim 11 wherein said substrate is a wire.

16. The connector of claim 13 wherein said substrate is a wire.

17. The connector of claim 10 wherein:
    the weight of silver in said connector is substantially no more than one-quarter of one percent (0.25%) of the weight of said connector.

18. The connector of claim 13 wherein:
    the weight of silver in said connector is substantially no more than one-quarter of one percent (0.25%) of the weight of said connector.

19. The connector of claim 14 wherein:
    the weight of silver in said connector is substantially no more than one-quarter of one percent (0.25%) of the weight of said connector.

20. The connector of claim 16 wherein:
    the weight of silver in said connector is substantially no more than one-quarter of one percent (0.25%) of the weight of said connector.

* * * * *